US007166837B2

(12) United States Patent
Mordehai

(10) Patent No.: US 7,166,837 B2
(45) Date of Patent: Jan. 23, 2007

(54) APPARATUS AND METHOD FOR ION FRAGMENTATION CUT-OFF

(75) Inventor: Alex Mordehai, Santa Clara, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 0 days.

(21) Appl. No.: 11/069,629

(22) Filed: Feb. 28, 2005

(65) Prior Publication Data

US 2006/0192112 A1 Aug. 31, 2006

(51) Int. Cl.
*B01D 59/44* (2006.01)

(52) U.S. Cl. ...................... 250/292; 250/282; 250/281; 250/288

(58) Field of Classification Search ..................... None
See application file for complete search history.

(56) References Cited

U.S. PATENT DOCUMENTS 5,696,376 A * 12/1997 Doroshenko et al. ....... 250/292
5,793,038 A * 8/1998 Buttrill, Jr. ................. 250/282
2005/0167585 A1* 8/2005 Makarov et al. ............ 250/290

* cited by examiner

*Primary Examiner*—Jack Berman
*Assistant Examiner*—Zia R. Hashmi

(57) ABSTRACT

A mass analyzer for isolating, fragmenting and scanning ions. The mass analyzer includes an ion trap having a first electrode, a second electrode adjacent to the first electrode, and a third electrode interposed between the first electrode and the second electrode, a first RF source electrically connected to the first electrode and second electrode and a second RF voltage source electrically connected to the third electrode. The second RF voltage source provides for a second electrical field for fragmenting ions and broadens the potential application of the fragmentation cut-off of the device allowing for analysis of peptides and other complex molecules. The mass analyzer may be used independently or in combination with a mass spectrometry system. A method of ion fragmentation and cut-off is also disclosed.

22 Claims, 5 Drawing Sheets

APPARATUS AND METHOD FOR ION FRAGMENTATION CUT-OFF

BACKGROUND

A mass spectrometry system is an analytical device that determines the molecular weight of chemical compounds by separating molecular ions according to their mass-to-charge ratio (m/z). Ions are generated by inducing either a loss or gain of charge and are then detected. Mass spectrometry systems generally comprise an ionization source for producing ions (i.e. electrospray ionization (EI), atmospheric photoionization (APPI), atmospheric chemical ionization (APCI), chemical ionization (CI), fast atom bombardment, matrix assisted laser desorption ionization (MALDI) etc.), a mass filter or analyzer (i.e. quadrupole, magnetic sector, time-of-flight, ion trap etc.) for separating and analyzing ions, and an ion detector such as an electron multiplier or scintillation counter for detecting and characterizing ions.

The first mass analyzers introduced in the early 1900's used magnetic fields for separating ions according to their mass-to-charge ratio. Just as ionization sources have evolved so have the mass analyzers to meet the demands of various chemical molecules. One type of mass analyzer is the ion trap. Ion trap mass analyzers operate by using two or more RF ring electrodes to trap ions of a particular mass-to-charge ratio. The ion trap mass analyzer was developed around the same time as the quadrupole mass analyzer and the physics behind both of these analyzers are very similar. These mass analyzers are relatively inexpensive, provide good accuracy and resolution, and may be used in tandem for improved separations. Typical mass range and resolution for ion trap mass analyzers are (Range m/z 2000; Resolution 1500). Other advantages of ion traps include small size, simple design, low cost, and ease of use for positive and negative ions. Ion trap mass analyzers have, therefore, become quite popular. However, ion traps suffer from a few particular problems. For instance, the limited range of current commercial versions as well as low energy collisions and ion fragmentation problems.

In order to address these problems MS/MS, 2-dimensional (2D) and 3-dimensional (3D) analytical techniques and methods of fragmentation have been developed. Commonly in 3D ion trap mass spectrometry the fragmentation is achieved by setting the main RF voltage to relatively high values to increase the depth of pseudo-potential trapping wells and also by applying a supplemental field on resonance with the fundamental frequency of the ion motion. The value of the RF amplitude that is used for the fragmentation can be expressed in terms of a dimensionless parameter q. Typically, q can range from 0 to 0.908 and from various derived equations the lowest stable mass within the ion trap can be determined. The lowest stable mass within the RF field is called the fragmentation cut-off limit. All the fragment ions with masses below the fragmentation cut-off limit are unstable within the RF ion trap and are impossible to analyze. Fragmentation cut-off has been an ongoing problem for ion traps and has limited the overall potential effectiveness and flexibility of ion traps.

It, therefore, would be desirable to alleviate this problem by substantially reducing the fragmentation cut-off for ion trap systems. In addition, it would be desirable to expand the range and types of molecules that may be analyzed using ion traps. For instance, it would be desirable to decrease fragmentation cut-off so low molecular weight fragmentation information can be used and developed for sequencing and characterizing various small molecules and peptides. In addition, it would be desirable to be able to isolate, trap and scan molecules of various sizes without having to move them between mass analyzers and/or collision cells. These and other problems presented have been obviated by the present invention.

SUMMARY OF THE INVENTION

The present invention relates to an apparatus and method for providing reduced ion fragmentation problems in a mass spectrometry system. The mass spectrometry system of the present invention comprises an ionization source, a mass analyzer/filter and an ion detector. The mass analyzer of the present invention comprises an ion trap having a first electrode, a second electrode adjacent to the first electrode, a third electrode interposed between the first electrode and the second electrode, a first RF source in electrical connection with the first electrode, and second electrode and a second RF source in electrical connection with the second electrode.

The invention also provides an ion trap. The ion trap of the present invention comprises an ion trap having a first electrode, a second electrode adjacent to the first electrode, a third electrode interposed between the first electrode and the second electrode, a first RF source in electrical connection with the first electrode and second electrode, and a second RF source in electrical connection with the second electrode.

The method of the present invention comprises ionizing a sample, applying a first RF field from a first RF source, or applying a second RF field from a second RF source to trap ions in an ion trap; applying a second RF field from a second RF source to fragment the ions in the ion trap; and applying and scanning a first RF field from a first RF source to eject the fragmented ions out of the ion trap for detection.

BRIEF DESCRIPTION OF THE FIGURES

The invention is described in detail below with reference to the following figures.

DETAILED DESCRIPTION OF THE INVENTION

Figure 1:
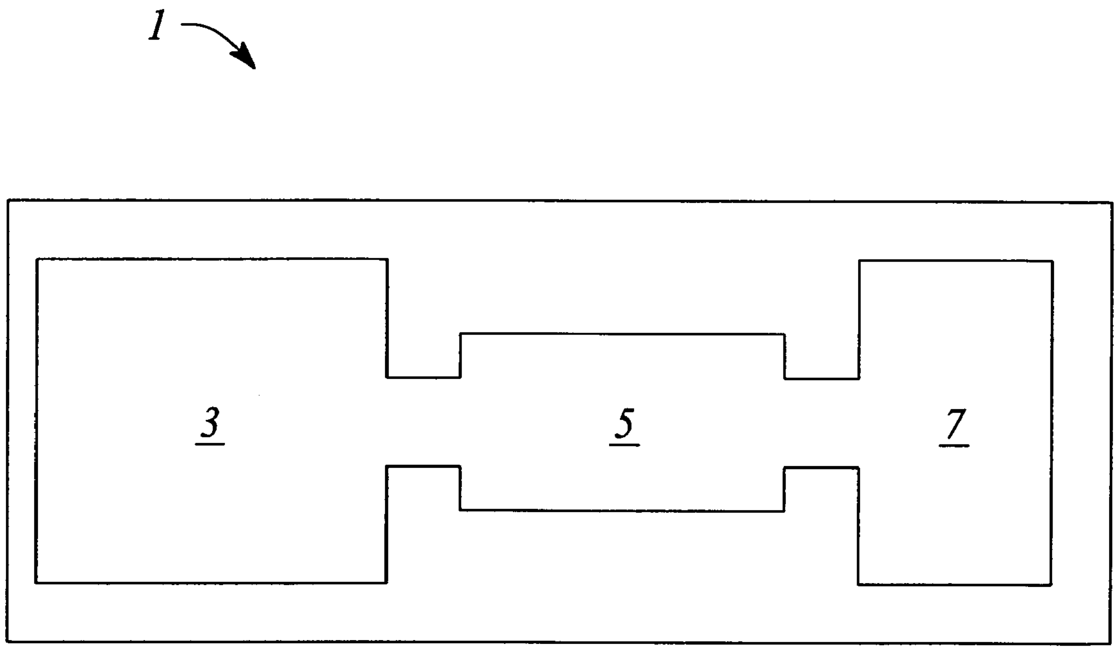
FIG. 1 shows general block diagram of a mass spectrometer system.

Before describing the invention in detail, it must be noted that, as used in this specification and the appended claims, the singular forms "a," "an," and "the" include plural referents unless the context clearly dictates otherwise. Thus, for example, reference to "an electrode" includes more than one "electrode". Reference to a "ring electrode" includes more than one "ring electrode". In describing and claiming the present invention, the following terminology will be used in accordance with the definitions set out below.

The term "adjacent" means, near, next to or adjoining. Something adjacent may also be in contact with another component, surround the other component, be spaced from the other component or contain a portion of the other component. For instance, an electrode that is adjacent to a ring electrode may be spaced next to the ring electrode, may contact the ring electrode, may surround or be surrounded by the ring electrode, may contain the ring electrode or be contained by the ring electrode, may adjoin the ring electrode or may be near the ring electrode.

The term "2-dimensional (2-D) ion trap" refers to a trap in which ions are focused in space in two dimensions along a defined line. For instance, one type of 2-D ion trap is a linear trap. The definition should be interpreted broadly to include any devices in the art where ions are defined in space in a similar manner.

The term "3-dimensional (3-D) ion trap" refers to an ion trapping device that produces a trapping field that is in three dimensional space. In other words, ions are trapped to a point in space. The definition should be interpreted broadly to include any devices known or used in the art where ions can be trapped at a point in space.

The term "electrode" refers to any electrode, electrode device, or device used to create an electric field that may be used for collecting or trapping ions. The term may be interpreted broadly, however, to also include any device, or apparatus that may comprise an electrode or ring electrode. Electrodes may also comprise endcaps or other similar type devices known and used in the art in 2-D and 3-D ion traps The term "group of electrodes" refers to two or more electrodes.

The term "detector" refers to any device, apparatus, machine, component, or system that can detect an ion. Detectors may or may not include hardware and software. In a mass spectrometer the common detector includes and/or is coupled to a mass analyzer.

The term "electrode" refers to a particular type of electrode that may be employed with the present invention.

The term "ion source" or "source" refers to any source that produces analyte ions.

The term "section" refers to one or more electrodes that may comprise a defined portion of a mass analyzer. Sections may typically comprise two or more electrodes that form a structure that may be used to create electric or magnetic fields that can be employed to manipulate or move ions in a defined direction.

The term "rod" refers to any number of solid structures that may be electrically conductive and may be used to create an electric or magnetic field for manipulating ions.

The invention is described with reference to the figures. The figures are not to scale, and in particular, certain dimensions may be exaggerated for clarity of presentation.

FIG. 1 shows a general block diagram of a mass spectrometer system. The block diagram is not to scale and is drawn in a general format because the present invention may be used with a variety of different types of mass spectrometry systems. A mass spectrometry system 1 of the present invention comprises an ion source 3, a mass analyzer 5 and a detector 7.

The ion source 3 may be located in a number of positions or locations. In addition, a variety of ion sources may be used with the present invention. For instance, electrospray ionization (EI), chemical ionization (CI), atmospheric pressure photon ionization (APPI), atmospheric pressure chemical ionization (APCI), matrix assisted laser desorption ionization (MALDI), atmospheric pressure matrix assisted laser desorption ionization (AP-MALDI) etc. or other ion sources well known in the art may be used with the invention. In particular, any source that may produce ions may be employed with the present invention. These sources may be known in the art or may be developed.

The mass analyzer 5 may comprise any number of devices known in the art for trapping ions. For instance, the mass analyzer may comprise an ion trap, a 2-D or 3-D ion trap, an ion trap or similar device in MS/MS mode or combinations of these devices capable of trapping ions.

The detector 7 is generally positioned downstream from the ion source 3 and the mass analyzer 5. The detector may comprise any number of detectors known in the art. For instance, the detector 7 may comprise any device capable of generating an output signal indicative of the analyte being studied. Detectors may include and not be limited to devices that generate secondary electrons which are amplified or which induce a current generated by a moving charge. Some of these types of detectors include the electron multiplier and the scintillation counter.

Figure 2:
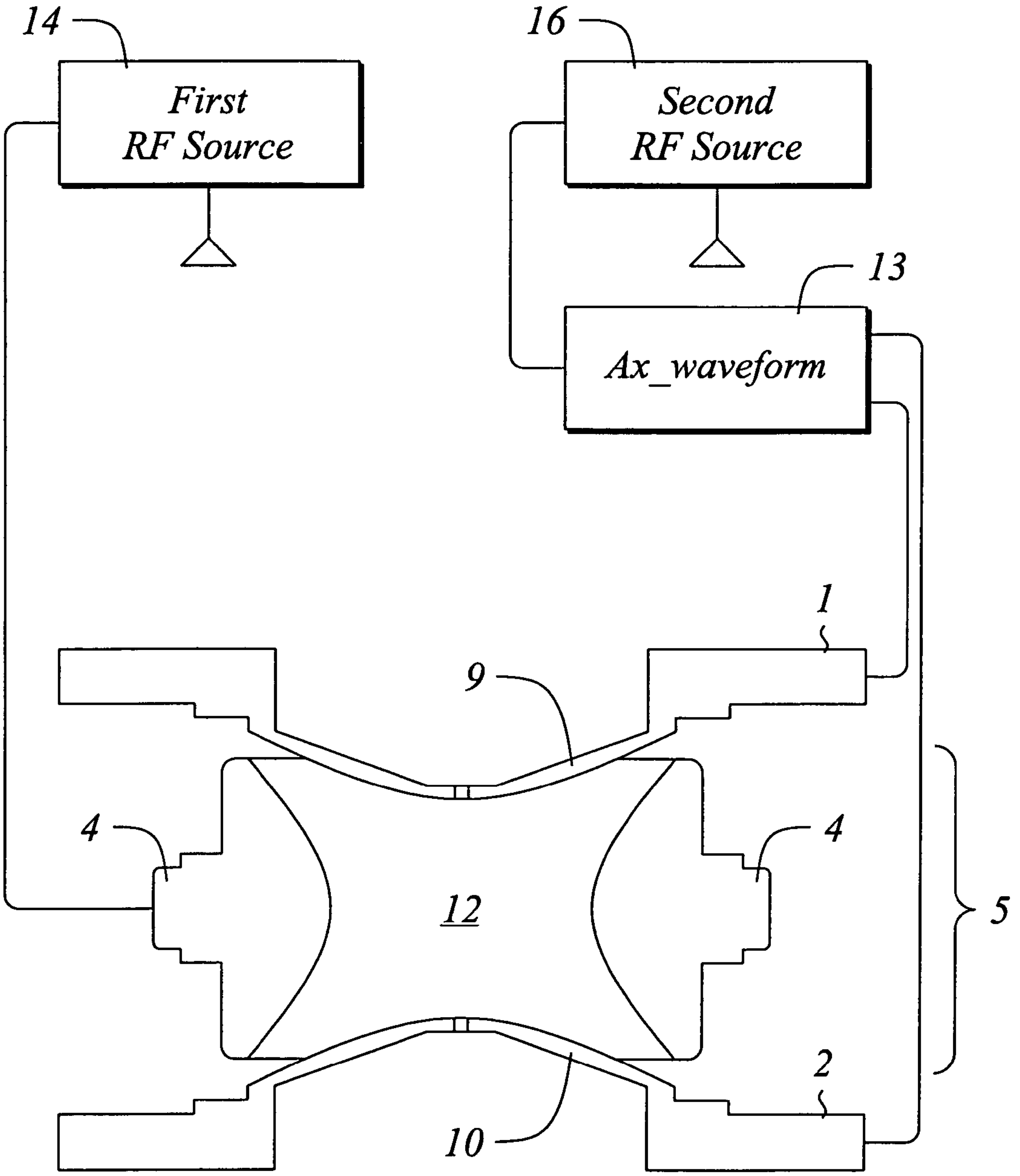
FIG. 2 shows a first embodiment of the present invention.

FIG. 2 shows a first embodiment of the present invention. The figure is not to scale and is for illustration and explanation purposes only. The mass analyzer 5 of the present invention may comprise an ion trap. The ion trap of the present invention comprises a first electrode 9, a second electrode 10 and a third electrode 4. The first electrode 9 is adjacent to the second electrode 10. The first electrode 9 and the second electrode 10 may comprise electrodes, standard electrodes and/or combinations of these designs. The third electrode 4 may be ring shaped and spaced from and interposed between the first electrode 9 and the second electrode 10. The first electrode 9 and the second electrode 10 may comprise any number of shapes and sizes. They may also comprise any number of metallic and non-metallic materials known in the art for creating electric fields. It is important that the electrodes 9 and 10 be capable of creating an electric or magnetic field for trapping ions within the ion cavity 12 of the ion trap.

The third electrode 4 is in electrical connection with a first RF voltage source 14. The first electrode 9 and the second electrode 10 are in electrical connection with a second RF voltage source 16. An optional auxiliary waveform generator 13 may also be in electrical connection with the electrodes 9 and 10 and the second RF voltage source 16. Also, a collisional gas e.g. helium or a similar gas may be introduced into the ion trap cavity 12. Various collisonal gases or gas mixtures known in the art may be employed with the present invention. In addition, various auxiliary waveform generators may also be employed with the present invention.

It is worth noting that FIG. 2 is not an electrical schematic of the present invention, but rather a diagram showing the mix and applications of different fields and waveforms applicable with the invention. It should be noted that the third electrode 4 is in electrical connection with the first RF voltage source 14, while the first electrode 9 and the second electrode 10 are in electrical connection with the second RF voltage source 16. This allows for the creation of a second field that may be used for manipulation and trapping of ions. In certain embodiments this field may be a quadrupolar field. However, the invention is not just limited to this embodiment. Other fields and designs may be employed with the present invention. In addition, the frequency of the second RF voltage source 16 may be higher than the frequency of the first RF voltage source 14. The second field inside of the ion trap is produced by the second RF voltage source 16, while during the scanning phase the first field is produced by the first RF voltage source 14. Only during very short time (e.g. 1 ms) at the beginning and at the end of the fragmentation period can the two fields co-exist to transfer trapped ions from one trapping field environment to the other. The present invention solves the fragmentation cut-off problem by providing a separate trapping field within the ion trap to stabilize the trajectories for the ions below the original fragmentation cut-off. The second field has a frequency and voltage that is optimized for the fragmentation, while the primary RF field has a frequency that is more suitable for the wide mass range trapping and scanning. Two trapping fields can co-exist only during very short time to transfer ions from one field to a different trapping field. This provides the ion trap of the present invention with flexibility in being able to handle various types of chemical molecules at a larger fragmentation cut-off range. It should be noted that each RF field of the present invention may be driven by a separate RF generator. Other trapping fields and RF generators may also be employed with the present invention. The present invention provides a way to substantially reduce the observed fragmentation (based on the main primary RF value) cut-off for the ion trap operation, so fragmentation information can be used to more completely sequence biochemical samples and other type derivatives.

In the case of a quadrupole, the equations for the fragmentation cut-offs for each of the trapping fields can be written:

$$m_0 = \frac{2eV_0}{q_0 z_0^2 v_0^2}$$

$$m_a = \frac{2eV_a}{q_a z_0^2 v_a^2}$$

Where vo and Vo are the frequency and the amplitude of the main quadrupole field; $v_a$ and $V_a$ are the amplitude and the frequency of the additional second quadrupole field. The equations for the pseudo-potential well in these fields are given by:

$$D_0 = \frac{eV_0^2}{4mz_0^2 v_0^2}$$

$$D_a = \frac{eV_a^2}{4mz_0^2 v_a^2}$$

Let us assume that the fragmentation pseudo-potential depth $D_a$, which is defined by the second field is the same as the pseudo-potential depth $D_0$ within the original main field to provide the same level of trapping during the fragmentation with respect to the precursor ions, i.e., $D_0=D_a$. In this case, the amplitude and the frequency of the second quadrupole field should be increased proportionally with respect to the amplitude and the frequency of the main field. Substituting the upper stability values for the q-parameters as $q_0=0.98$; $q_a=0.908$ in the equations above; and assuming that $V_a>V_0$, it can be determined that $m_a<m_0$, i.e., the fragmentation cut-off for the additional quadrupole field is inversely proportional to the frequency of the second field and smaller than the original fragmentation cut-off. For example, if $V_a=3V_0$, the estimated fragmentation cut-off is $M_n=M_0/3$, which is three times lower than the original fragmentation cut-off. The present invention and techniques have application to a variety of ion traps. The second figure shows a basic idea of an ion trap of the present invention. More complex series, combinations or applications are also possible. For instance, various MS/MS, ion trap combinations, 2D and 3D ion traps may also be employed. A further extensive description of these devices is provided below.

Figure 4:
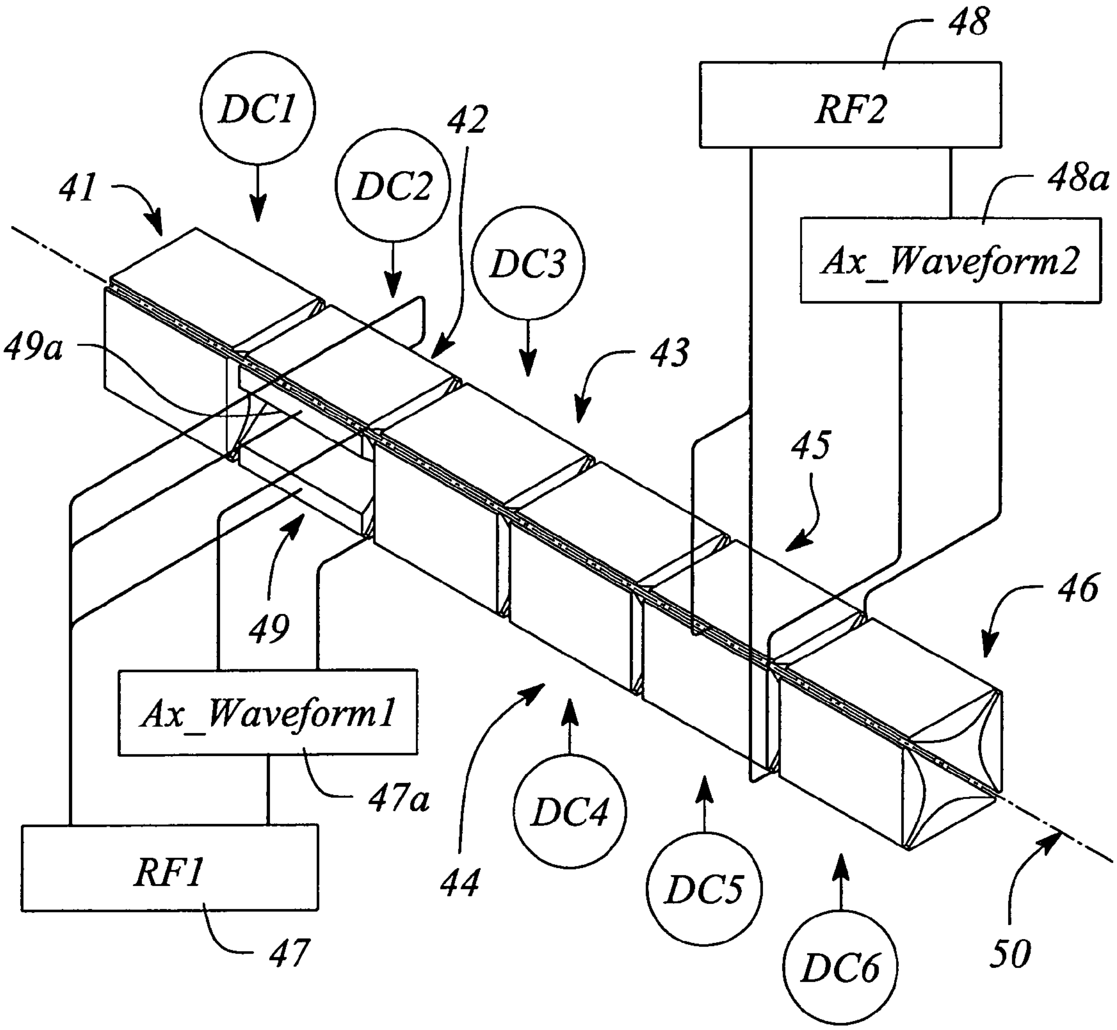
FIG. 4 shows a perspective view of a second embodiment of the present invention in MS/MS mode.

Referring now to FIG. 4, the same principles that were described for the 3D ion traps are applicable to the 2D ion traps. However, in the case of 2D ion traps it is more convenient to physically separate fields with different frequencies and transfer ions between these field regions, rather than switching these fields on and off as done in the case of the 3D ion traps described above. In one embodiment, the 2D ion trap can be assembled out of six separate sections 41, 42, 43, 44, 45, 46 that each comprise a group of electrodes. Section 45 provides the first group of trapping electrodes and section 42 belongs to the second group of trapping electrodes. According to the present invention these two groups of electrodes are connected to the two different RF generators creating two trapping fields with substantially different oscillating frequencies. Therefore, sections 42 and 45 are electrically connected with a first RF voltage source 47 and a second RF voltage source 48. The first RF voltage source 47 and a second RF voltage source 48 provide RF voltage with substantially different frequencies. The sections 41, 43, 44 and 46 can be used as guard sections and can be capacitively coupled or connected to the RF voltage sources 47 and 48 to provide substantially uniform fields within sections 42 and 45 respectively.

It should also be note that sections 46 and 41 may comprise electrodes in the form of end-caps. Theoretically, in this type of arrangement the sections 42, 43, 44, 45 would be in the form of one or more ring electrodes. However, in this embodiment, two different trapping field RF generators would be employed. For instance, the sections 41, 42, and 43 would be connected to the first trapping RF generator 47, while sections 44, 45, 46 would be connected to the second RF generator 48. During the operation of the present invention ions would be trapped by the different fields during fragmentation and scanning/trapping operations. It is also recognized that trapping fields in many cases would be quadrupolar 2D or 3D geometry. However, this is not a requirement of the invention and other designs may be possible.

Figure 5:
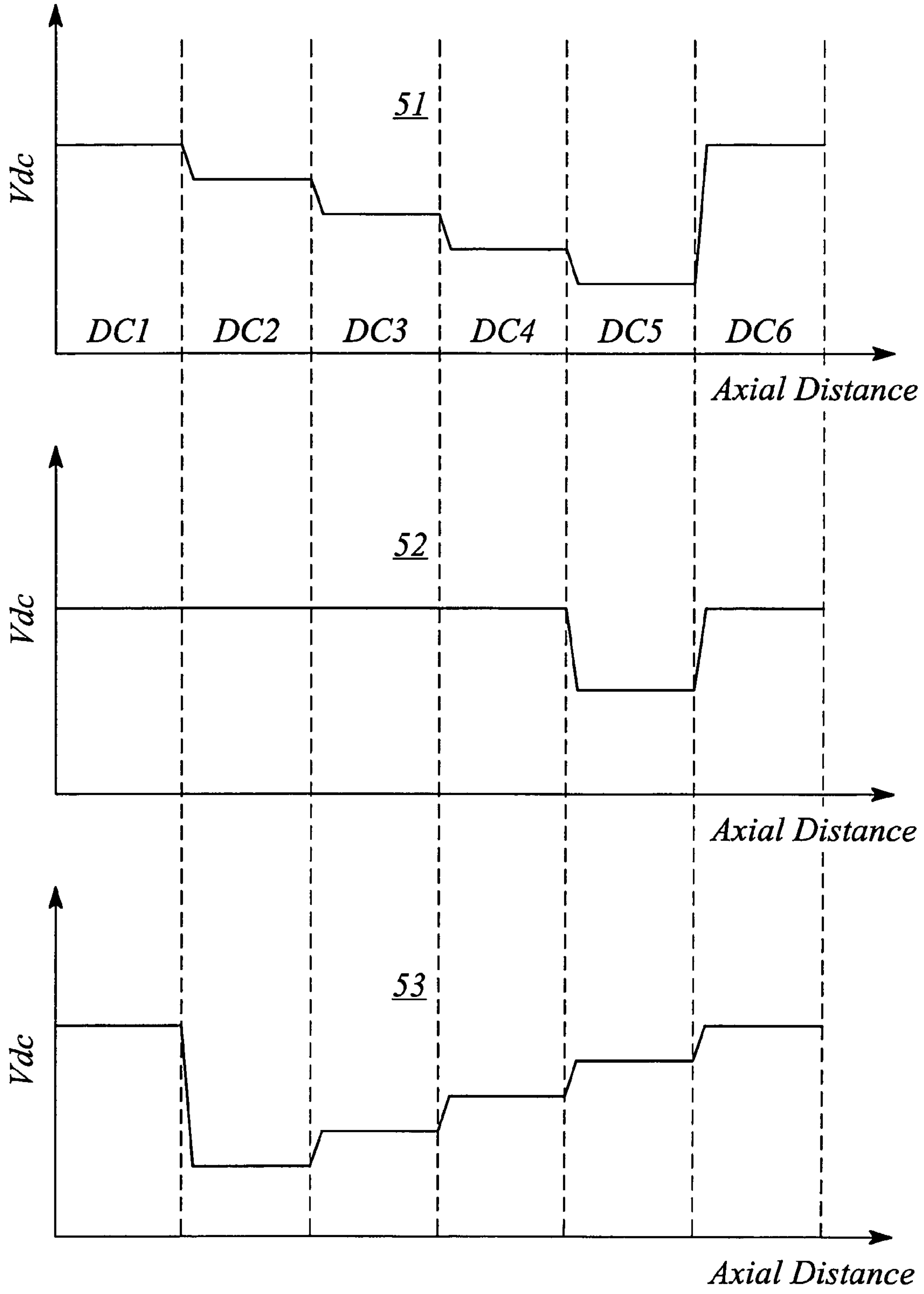
FIG. 5 shows a trace diagram of the various DC potentials applied to the present invention at varying times.

Thus, ions can be manipulated within the ion trap for storage fragmentation and scanning between sections 42 and 45 as described later. For example, ions can be transferred from one section to another using various DC voltages on the various sections 41, 42, 43, 44, 45, and 46. The appropriate DC voltages to achieve such ion transformations are shown in FIG. 5 along with the plot of the DC potential along the central axis 50 of the 2D ion trap. Panel 51 shows the distribution of the DC potential along the central axis 50 of the 2D ion trap corresponding to the case where all the ions are transferred and trapped within the section 45.

Panel 53 shows the distribution of the DC potential along the central axis 50 of the 2D ion trap at the time of ion transfer from the section 45 back to the section 42, which corresponds to the new minimum of the potential. According to the present invention ions are first introduced and accumulated within the section 42. The RF generator 47 provides a trapping field within section 42. After the initial accumulation step, ions of interest can be isolated according to their mass to charge ratio by applying selection waveform by the auxiliary RF generator 47*a*. Then ions are transferred to the region of higher frequency field provided by the second RF voltage source 48 within section 45. Then the resonance fragmentation waveform can be applied by the auxiliary first RF voltage source 48*a*. After that, fragmented and remaining precursor ions can be transferred back to the section 42 and scanned out through the gap 49*a* within the rod 49. This is accomplished, for example, by the mass instability scanning technique. This technique is well known in the art. It is recognized that ions can also be accumulated, isolated and then fragmented within the section 45 and then transferred to the scanning section 42 for detection. Alternatively, ions can be pulsed out axially to a different tandem mass analyzer, such as a time-of-flight mass analyzer.

Other modifications of the method are possible depending upon the particular required task. For instance, one of the rods of section 45 can also have an opening for ions to exit. This can be structured similar to the rod 49 as shown in section 42. In this case, the ion detection, isolation and fragmentation can be performed in either of sections 42 or 45 depending on the mass-to-charge ratios of the analyzed ions and frequencies of the trapping fields within the sections 42 and 45. Also, the section 45 can have a distorted geometry or design (different from the pure quadrupole design). For instance, a octapole field can be created using various rod sections or designs to increase ion fragmentation efficiency with lower ion loss. Since different field regions are generally required for such fragmentations and detections, the amount of octapole field component within the fragmentation-trapping field can be optimized specifically for ion fragmentation.

In addition, it is also possible to use additional sections for designing different RF trapping fields. It is also recognized that less than six sections can also be used. For instance, dual trapping fields for a 2D ion trap. However, the homogeneity of the fields can be affected with this type of design. It is also possible that the frequencies of the trapping fields can also be designed to synchronize or be in a multiple format. The present invention not only provides improvement over fragmentation limitations, but also increases the fragmentation energy levels. Higher fragmentation energy provides additional structural information regarding analytes as well as increases the range of analytes that may be analyzed. For instance, it opens up the possibility of fragmenting more stable ions that could not be previously fragmented.

Figure 3:
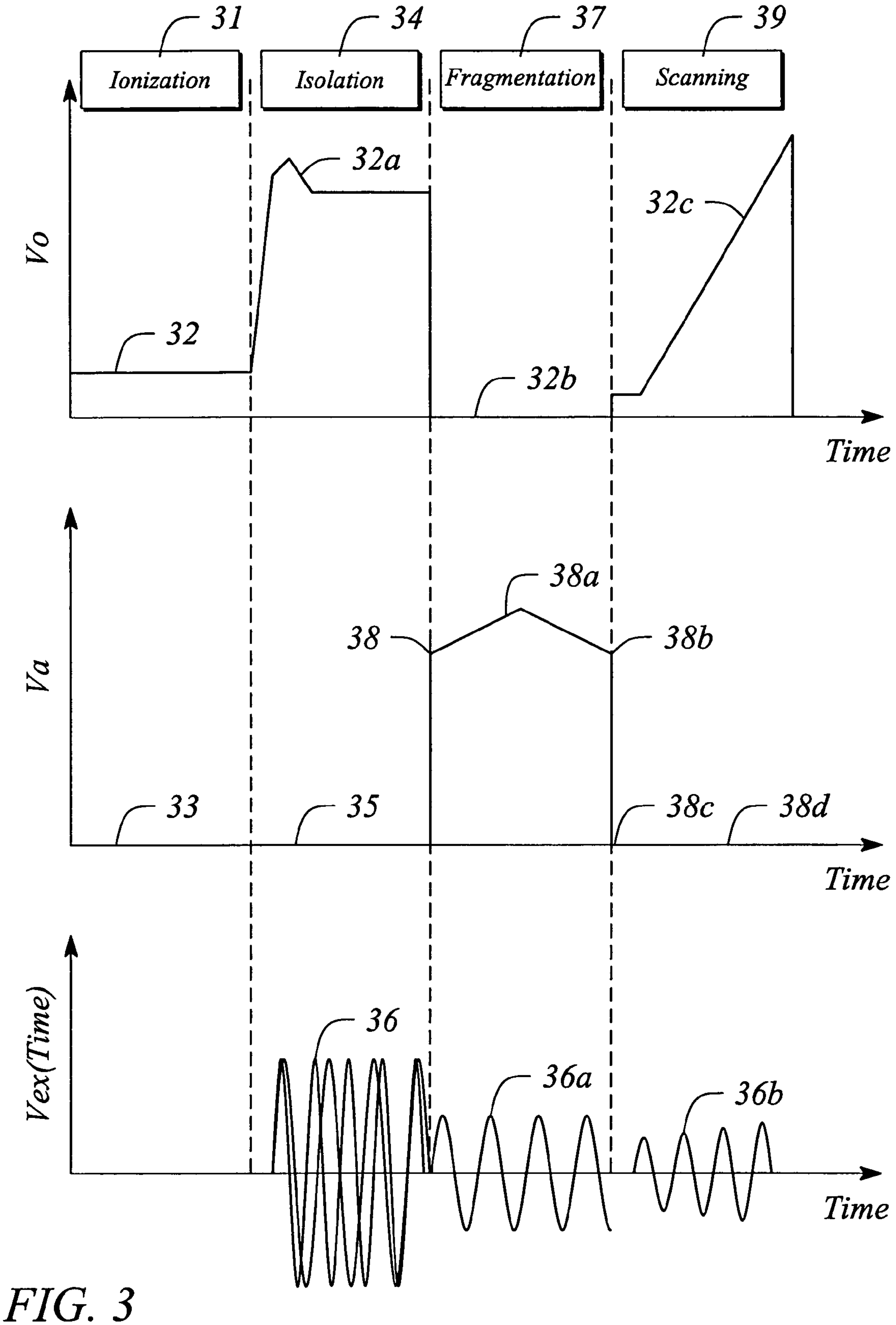
FIG. 3 shows a trace diagram of the various modes of operation of the present invention.

Having described the apparatus of the invention, a description of the method of operation is now in order. FIG. 3 shows a time sequence diagram of the operation of an embodiment of the present invention. According to the figure, ions are created and injected into a 3-D ion trap during ionization time interval 31, while first RF voltage source 14 produces and maintains an RF field at the trapping level 32. The second RF voltage source 16 can be turned off, as indicated on the FIG. 3 by the zero trace level 33 (see diagram). After initial ion accumulation during the isolation time-period 34, ions can be isolated to selectively trap within the ion trap only ions of a particular m/z ratio of interest. This can be done by a number of known techniques in the art. During the time interval 34, the second RF voltage source 16 can be turned off. This is shown in FIG. 3 by the zero trace level 35. The second RF voltage source 16 can be used then to generate isolation waveforms as indicated by the reference numeral 36. The amplitude $V_0$ of the first field produced by RF voltage source 14 can be changed to achieve isolation as indicated by the numerical trace 32*a*. During the next time interval 37 the fragmentation of the precursor ion is performed. According to the present invention, the second RF voltage source 16 is now turned on, so the amplitude $V_a$ jumps to the initial fragmentation level 38. The main RF field is switched off preferably with small time overlapping between the first and second RF fields (overlapping now shown in FIG. 3). The near zero voltage of the first RF voltage source during the fragmentation interval is indicated by the reference numeral 32*b*. At about the same time the Second RF voltage source 16 is activated to generate the fragmentation resonance waveform as indicated by the numerical reference 36*a*. The level of the voltage produced by the second RF voltage source can be adjusted slightly during the fragmentation process to insure uniform and reproducible fragmentation of the precursor ions. This slow change is indicated in FIG. 3 by the dome looking trace 38*a*.

In another embodiment, the Second RF voltage source 16 can maintain a field that is substantially steady at level 38 (not shown in FIG. 3). The frequency of the field of the second RF voltage source 16 is higher relative to the frequency of the field produced by the first RF voltage source 14 and, therefore, the fragmentation cut-off is lower as described above. At the end of the fragmentation period 38*b*, the first RF voltage source is restored to the value somewhat below the corresponding value of the fragmentation cut-off, $m_a$. Shortly, thereafter (about 1 ms later), the second RF field is turned off as indicated by 38*c*, and fragmented ions are scanned out and detected during time interval 39. Scanning can be accomplished, for example, by the mass instability technique, wherein the field of the first RF voltage source 14 is ramped as indicated by trace 32*c*, while the second RF voltage source 16 produces a field having a sine wave function 36*b* that sequentially injects fragmented ion out of the ion trap to the detector 5 (not shown in diagram). During scanning, the second RF voltage source 16 is off again, as indicated by the zero trace 38*d* of FIG. 3.

It is to be understood that while the invention has been described in conjunction with the specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications infra and supra mentioned herein are hereby incorporated by reference in their entireties.

I claim:

1. A mass spectrometry system, comprising:

(a) an ionization source for producing ions, (b) a mass analyzer downstream from the ionization source for isolating, fragmenting and scanning ions produced by the ionization source, the mass analyzer comprising an ion trap having a first electrode, a second electrode adjacent to the first electrode, a third electrode interposed between the first electrode and the second electrode, a first RF source electrically connected to the first electrode and second electrode, and a second RF source electrically connected to third electrode; and (c) a detector downstream from the mass analyzer for detecting ions from the mass analyzer.

2. A mass spectrometer system as recited in claim 1, comprising a two dimensional mass analyzer.

3. A mass spectrometer system as recited in claim 1, comprising a three dimensional mass analyzer.

4. A mass spectrometer system as recited in claim 1, further comprising an auxiliary waveform generator.

5. A mass spectrometer system as recited in claim 4, wherein the auxiliary waveform generator is in electrical connection with the second RF voltage source.

6. A mass spectrometer system as recited in claim 5, wherein the auxiliary waveform generator is in electrical connection with the first electrode and the second electrode.

7. A mass spectrometer system as recited in claim 1, wherein the third electrode comprises a ring.

8. A mass spectrometer system as recited in claim 1, further comprising a section.

9. A mass spectrometer system as recited in claim 8, wherein the modular section comprises at least one rod.

10. A mass analyzer for a mass spectrometry system, comprising an ion trap having a first electrode, a second electrode adjacent to the first electrode, a third electrode interposed between the first electrode and the second electrode, a first RF source electrically connected to the first electrode and second electrode and a second RF source electrically connected to the electrode for providing ion isolation, scanning and fragmentation.

11. A mass analyzer as recited in claim 10, comprising a two dimensional mass analyzer.

12. A mass analyzer as recited in claim 10, comprising a three dimensional mass analyzer.

13. A mass analyzer as recited in claim 10, further comprising an auxiliary waveform generator.

14. A mass analyzer as recited in claim 13, wherein the auxiliary waveform generator is in electrical connection with the second RF voltage source.

15. A mass analyzer as recited in claim 14, wherein the auxiliary waveform generator is in electrical connection with the first electrode and the second electrode.

16. A mass analyzer as recited in claim 10, wherein the third electrode comprises a ring.

17. A mass analyzer as recited in claim 10, further comprising a section.

18. A mass spectrometer system as recited in claim 17, wherein the section comprises at least one rod.

19. A method of trapping, fragmenting and scanning ions in a mass spectrometry system, comprising:

(a) ionizing a sample;

(b) applying a first RF field from a first RF voltage source to trap ions in a mass analyzer;

(c) applying a second RF field from a second RF voltage source to fragment ions in the mass analyzer; and (d) scanning the fragmented ions.

20. The method of claim 19, wherein the mass analyzer comprises an ion trap.

21. The method of claim 19, wherein the sample ionizing step is accomplished using an ion source selected from the group consisting of an ion trap, an APPI source, an EI source, an APCI source, a multimode source, and a CI source.

22. The method of claim 19, further comprising detecting the ions.

* * * * *